(No Model.)  2 Sheets—Sheet 1.
G. M. MILLS.
ICE BREAKER.
No. 246,029.  Patented Aug. 23, 1881.
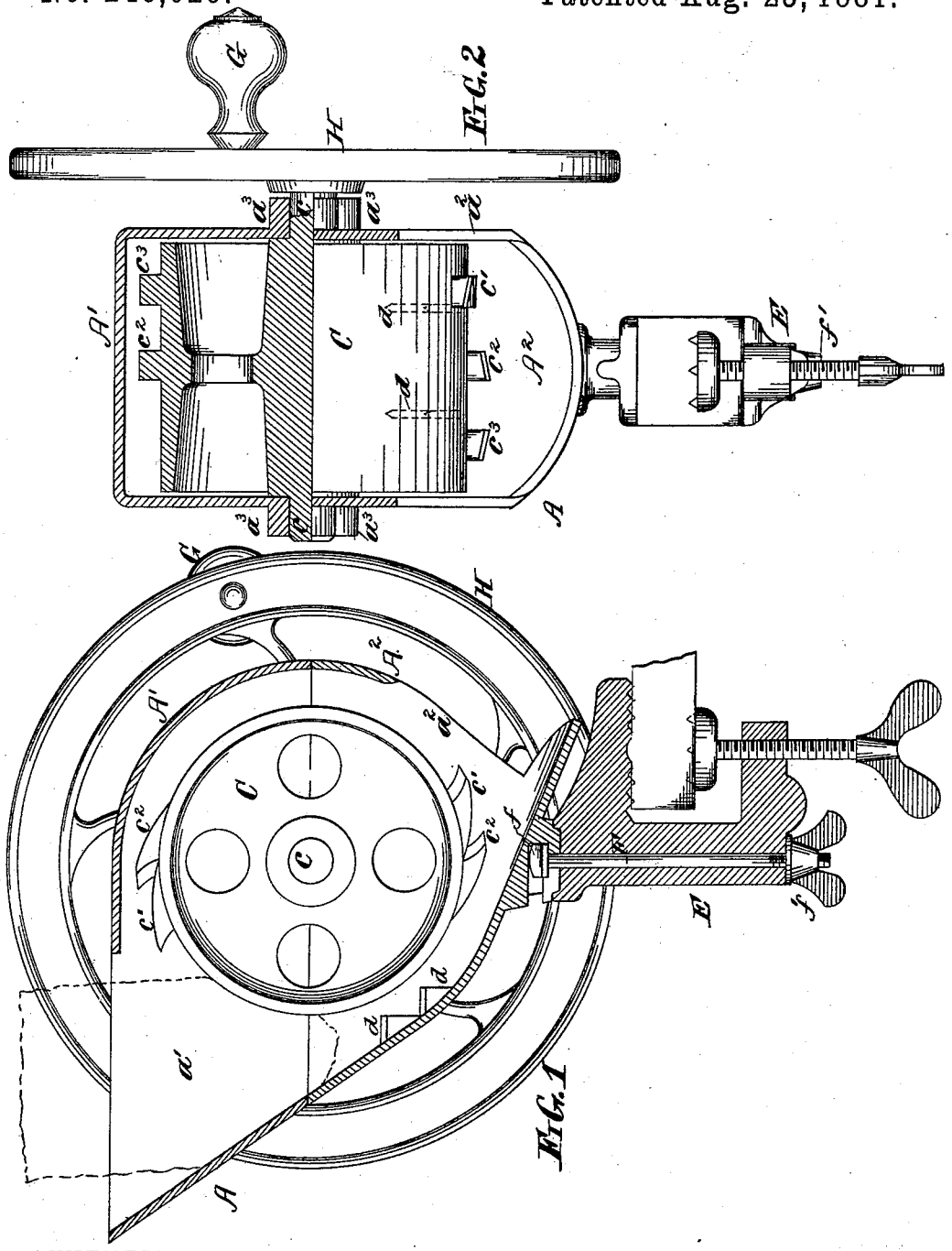

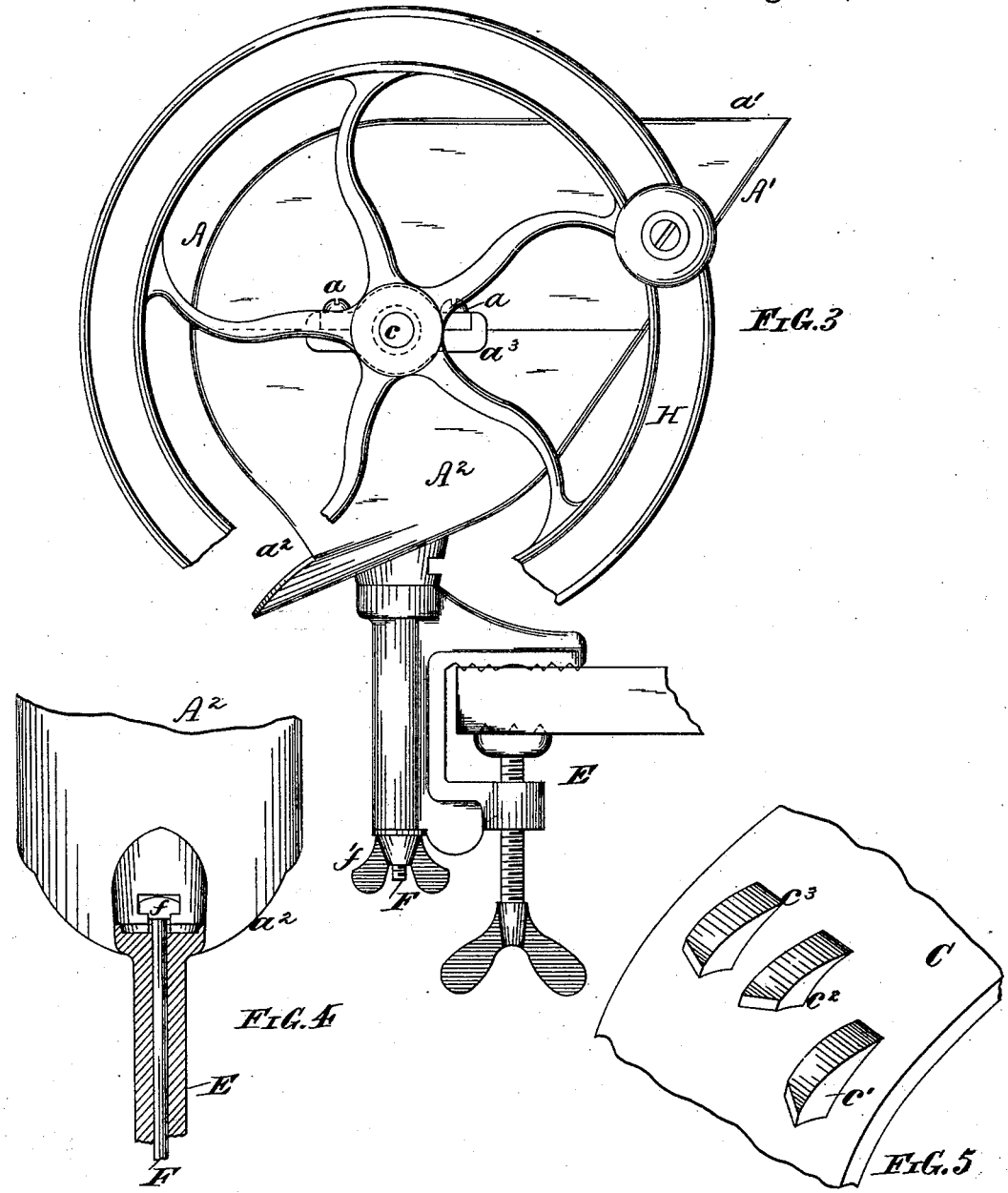

UNITED STATES PATENT OFFICE.

GEORGE M. MILLS, OF PHILADELPHIA, PENNSYLVANIA.

ICE-BREAKER.

SPECIFICATION forming part of Letters Patent No. 246,029, dated August 23, 1881.

Application filed May 14, 1880. (No model.)

*To all whom it may concern:*

Be it known that I, GEORGE M. MILLS, a citizen of the United States, residing at the city of Philadelphia, in the State of Pennsylvania, have invented Improvements in Ice-Breaking Machines, reference being had to the accompanying drawings, forming part of this specification, wherein—

Figure 1 is a longitudinal vertical section of my invention. Fig. 2 is an end elevation, partly in section. Fig. 3 is a side elevation. Fig. 4 is a sectional detail view of the swivel-connection, and Fig. 5 is a perspective detail of the breaking-teeth.

My invention has for its object to provide a compact, durable, and effective machine for breaking lumps of ice into small pieces, suitable principally for use in families, bar-rooms, and soda-water dispensatories.

My invention consists in the peculiar construction and combination of parts hereinafter specified, reference being had to the following points particularly: first, to the peculiar constructional form of the teeth or picks, so that the same shall give an effective and penetrating blow to the ice designed to be broken, while resisting fracture themselves; second, to connecting the hopper or housing of the machine to its clamp or base by a swivel-joint, so as to permit the machine to be readily turned around and made fast in any convenient position.

Referring to the accompanying drawings, A designates the housing, which is made in the form of a hopper, in two parts, A' A², screwed or bolted together at *a a*. The upper part, A', has a mouth or opening, *a'*, for the insertion of the lump of ice to be broken, and the lower has a discharge spout or chute, $a^2$, for the broken pieces. The sections A' A² are formed with boxes $a^3$, which afford bearings to the journals *c c* of a cast-iron cylinder, C, made in one piece. Said cylinder has teeth $c' c^2 c^3$, which are integral with it, being formed in the casting and chilled, so as to give them the required degree of hardness to act as picks or breakers. Said teeth are of the peculiar form shown, their faces being beveled from the periphery of the cylinder to their edges, and said faces inclining or sloping from one side of each tooth to the other side, thus producing a point which is in advance of the remaining part of the tooth. The edge of the tooth is produced by grinding downwardly from the back toward the face, thus bringing said edge on a plane below the back, whereby it is made less liable to chip or break than if ground from the under side. The teeth are arranged in two ranks on opposite sides of the cylinder, thus leaving clear spaces on the body of said cylinder with which the lump of ice to be broken can come in contact. The teeth of each of said ranks have their faces and edges inclined in opposite directions alternately, and one tooth of each rank is in advance of the other teeth in the same rank. The advanced tooth of one rank is also on the opposite side annularly of the cylinder from the other advanced tooth—*i. e.*, one of said teeth is on the right and the other on the left side of the cylinder. By this arrangement the advanced tooth of one rank is in line annularly with the backward teeth of the other rank.

By having one tooth of a rank or row projecting in front of the other teeth in the same row a better striking or picking action is secured than if all the teeth were in line, and a piece of ice detached from the large lump by such advance tooth will be thrown to one side of it, and thus brought under the teeth following.

By having the advanced tooth of one rank out of line annularly with such tooth of the other rank the lump of ice will be picked on both the right and left sides, the detached parts being thrown alternately from side to side, and thus effectually reduced to small pieces. The beveled faces of the teeth not only serve to make wedges of the latter, whereby they will enter the lump readily and rend it asunder, but also to move the detached pieces to one side or the other, so as to bring them in line with and subject them to the action of the teeth following.

By making the teeth in two ranks and locating these diametrically opposite to one another, instead of distributing them uniformly over the entire surface of the cylinder, clear spaces are left on the latter, with which the lump of ice to be broken will come in contact. The lump of ice to be broken thus coming in contact with the body of the cylinder, the teeth will strike said lump well in toward its interior, and thus act as picks or breakers; whereas if the teeth were so arranged that the lump of ice could not reach said body or touch its perimeter, said teeth would only act as scorers or shavers.

*d d* are teeth formed on the inclined side of the hopper, which act as stops, supporting the lump to be broken in position and preventing detached pieces from passing out from the hopper until sufficiently disintegrated by the action of the teeth $c'$ $c^2$ $c^3$, &c.

E represents a clamp, on which the hopper or housing A is sustained. Said housing or hopper is swiveled on the clamp by means of a bolt, F, having head $f$ and thumb-nut $f'$, so that it can be turned into any position convenient with respect to the handle G or discharge $c$. Said handle is secured to a fly-wheel, H, on the shaft or journal of the cylinder C.

I have shown only two rows or ranks of teeth on the cylinder, and three teeth in each row or rank, one of said teeth in each row being advanced beyond the others, leaving two teeth in the same line backward of such advanced tooth; and these I regard as quite sufficient for a small breaker for family and the other uses suggested; but for larger breakers, to which the principle of my invention is also applicable, the cylinder may have more than two rows or ranks of teeth, clear spaces on the body being always left between such rows, and each row or rank may have more than three teeth, the number of the latter depending upon the width of the cylinder. In such case, also, there may be more than one advanced tooth—*i. e.*, two or more teeth—the faces and edges of said advanced teeth inclining in opposite directions, similar to those of the backward or rear teeth shown in the drawings.

What I claim as my invention is—

1. In combination with the housing A, the cast-iron cylinder C, having teeth $c'$, &c., with faces beveled and edges inclined in opposite directions alternately, substantially as shown and described.

2. The combination, with the hopper or housing A and ice-breaking cylinder C, of the clamp E and swivel-rod F, substantially as set forth.

In testimony that I claim the foregoing I have hereunto set my hand this 12th day of May, 1880.

GEORGE M. MILLS.

Witnesses:
S. J. VAN STAVOREN,
CHAS. F. VAN HORN.